(12) United States Patent
Cheng

(10) Patent No.: US 8,774,193 B2
(45) Date of Patent: Jul. 8, 2014

(54) PIPELINE NETWORK DEVICE AND RELATED DATA TRANSMISSION METHOD

(75) Inventor: Tsung-Yo Cheng, New Taipei (TW)

(73) Assignee: Acer Incorporated, Xizhi Dist., New Taipei (TW)

( * ) Notice: Subject to any disclaimer, the term of this patent is extended or adjusted under 35 U.S.C. 154(b) by 298 days.

(21) Appl. No.: 13/095,880

(22) Filed: Apr. 28, 2011

(65) Prior Publication Data

US 2012/0198463 A1 Aug. 2, 2012

(30) Foreign Application Priority Data

Jan. 31, 2011 (TW) .............................. 100103628 A

(51) Int. Cl.
*H04L 12/28* (2006.01)
*H04Q 11/04* (2006.01)

(52) U.S. Cl.
CPC ................................ *H04Q 11/0478* (2013.01)
USPC ........................................................ 370/395.3

(58) Field of Classification Search
CPC ................................................. H04Q 11/0478
USPC ........................................................ 370/395.3
See application file for complete search history.

(56) References Cited

U.S. PATENT DOCUMENTS

| | | | | |
|---|---|---|---|---|
| 2005/0026616 | A1* | 2/2005 | Cavalli et al. | 455/436 |
| 2005/0185651 | A1* | 8/2005 | Rinne | 370/395.1 |
| 2009/0181676 | A1* | 7/2009 | Lee et al. | 455/436 |
| 2009/0303913 | A1* | 12/2009 | Yu et al. | 370/312 |
| 2010/0240367 | A1* | 9/2010 | Lee et al. | 455/435.2 |

FOREIGN PATENT DOCUMENTS

| | | |
|---|---|---|
| CN | 1535520 A | 10/2004 |
| CN | 101668005 A | 3/2010 |
| EP | 1 643 690 A1 | 4/2006 |
| WO | 0219619 A2 | 3/2002 |
| WO | 0219619 A3 | 3/2002 |
| WO | 2009145354 A1 | 12/2009 |

* cited by examiner

*Primary Examiner* — Phuongchau B Nguyen
(74) *Attorney, Agent, or Firm* — Winston Hsu; Scott Margo

(57) ABSTRACT

A pipeline structure having a plurality of pipelines with varying data rates is used for transmitting data between different layers in a network device. Important data is transmitted by a faster pipeline, while less important data is transmitted by a slower pipeline. The size of each pipeline may be dynamically adjusted according the transmission status of each pipeline for improving the overall data efficiency.

11 Claims, 5 Drawing Sheets

PIPELINE NETWORK DEVICE AND RELATED DATA TRANSMISSION METHOD

BACKGROUND OF THE INVENTION

1. Field of the Invention

The present invention is related to a network device and related method for data transmission, and more particularly, to an adjustable pipeline network device and related method for data transmission.

2. Description of the Prior Art

With rapid development in technology, a user may easily connect to a network using desktop computers, notebook computers, personal digital assistants (PDAs) or smart phones. In order for electronic equipment having varying specifications to be able to communicate with the same network, a network model OSI (Open Systems Interconnection) has been provided by ISO (International Organization for Standardization) for managing the network intercommunication between two systems.

The OSI model defines 7 layers for network transmission, sequentially including physical layer (layer 1), data link layer (layer 2), network layer (layer 3), transport layer (layer 4), session layer (layer 5), presentation layer (layer 6), and application layer (layer 7). The $1^{st}$ physical layer is defined as the bottom layer closest to hardware devices, while the $7^{th}$ application layer is defined as the top layer closest to software programs. Each layer has distinct function and separate program codes. The functions and applications of the OSI model are well-known to those skilled in the art and will not be described in detail in the present invention.

In a network environment, each layer of a receiving device or a transmitting device is configured to recognize data from the same. For data transmission from a transmitting network device to a receiving network device, data is transmitted from the top layer 7 sequentially to the bottom layer 1 as corresponding data packages using application programs in the transmitting network device. After receiving data packages from the bottom layer 7 of the transmitting network device, the receiving network device sequentially unpacks each data package, which is then distributed to a corresponding layer of the receiving network device. Assigned for different tasks, each layer may have varying transmission parameters and buffer sizes. Data stall may happen when transmitting data from a faster top layer to a slower bottom layer. Also, a faster bottom layer may not be able to improve data throughput if a top layer encounters insufficient data buffer or transmission blockages.

SUMMARY OF THE INVENTION

The present invention provides a method for data transmission in a network device having a multi-layer structure. The method includes providing a plurality of pipelines with varying data rates for transmitting a plurality of data between a first layer and a second layer of the multi-layer structure; and transmitting each data using a corresponding pipeline among the plurality of pipelines according to a data type of each data.

The present invention also provides a pipeline network device including a first layer circuit; a second layer circuit; a plurality of pipelines with varying data rates for transmitting a plurality of data between the first layer circuit and the second layer circuit; and a priority scheduler for distributing each data to a corresponding pipeline among the plurality of pipelines according to a data type of each data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
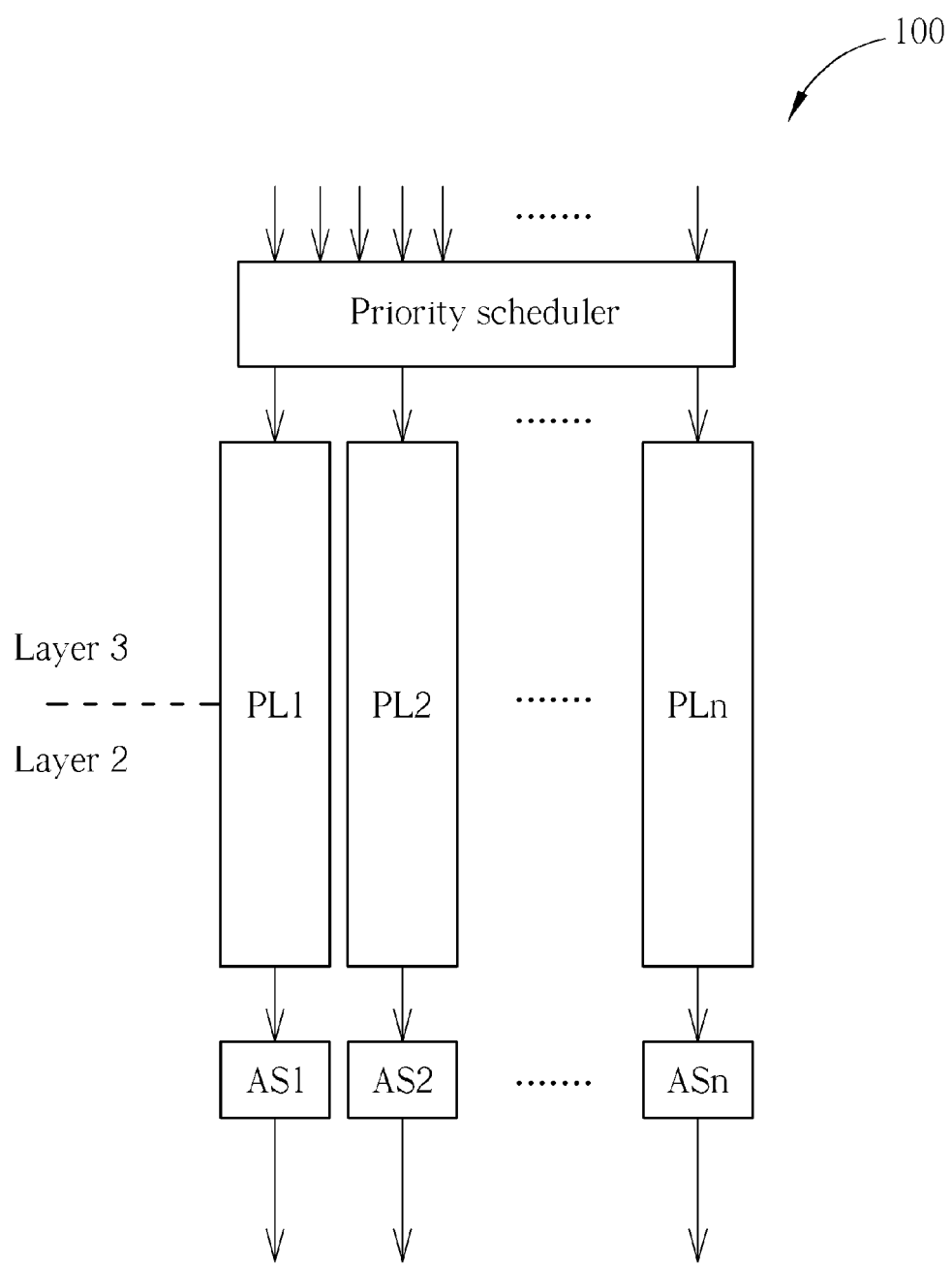
FIGS. 1-4 are diagrams illustrating a network device according to embodiments of the present invention.

FIG. 1 is a diagram illustrating a network device 100 according to a first embodiment of the present invention. The network device 100 may be a receiving device or a transmitting device in a network environment based on OSI model. The intercommunication between layer 2 and layer 3 is used for illustrating the first embodiment of the present invention. In the OSI model, the communication protocol between layer 2 and layer 3 includes AS (access stratum) and NAS (access stratum). AS protocol, responsible for signal handling, parameter setup or resource allocation of wireless access, includes MAC (media access control), RLC (radio link control), PDCP (packet data convergence protocol), BMC (broadcast/multicast control) and RRC (radio resource control). The network device 100 according to the first embodiment of the present invention may be applied to a WCDMA (wide band code division multiple access) network capable of providing AS protocols having varying transmission rates (represented by AS1-ASn) for data transmission using OVSF (orthogonal variable spreading factor) encoding. Meanwhile, a pipeline structure having pipelines PL1-PLn are used for parallel data transmission between layer 2 and layer 3 in the network device 100. Under normal circumstance, the speed relationship of the AS protocols and pipelines are as follows: AS1>AS2> . . . >ASn and PL1>PL2> . . . >PLn.

For data transfer from layer 3 to layer 2, a priority scheduler is used in the network device 100 according to the first embodiment of the present invention for determining data type. The data is distributed to corresponding AS1-ASn via respective pipelines PL1-PLn according to data priority. For instance, a high priority control signal may be distributed to the fastest AS1 via the fastest pipeline PL1, while a low priority data signal may be distributed to the slowest ASn via the slowest pipeline PLn. In other words, the present invention may relocate more resources for handling high priority data, thereby enhancing the overall system efficiency.

Figure 2:
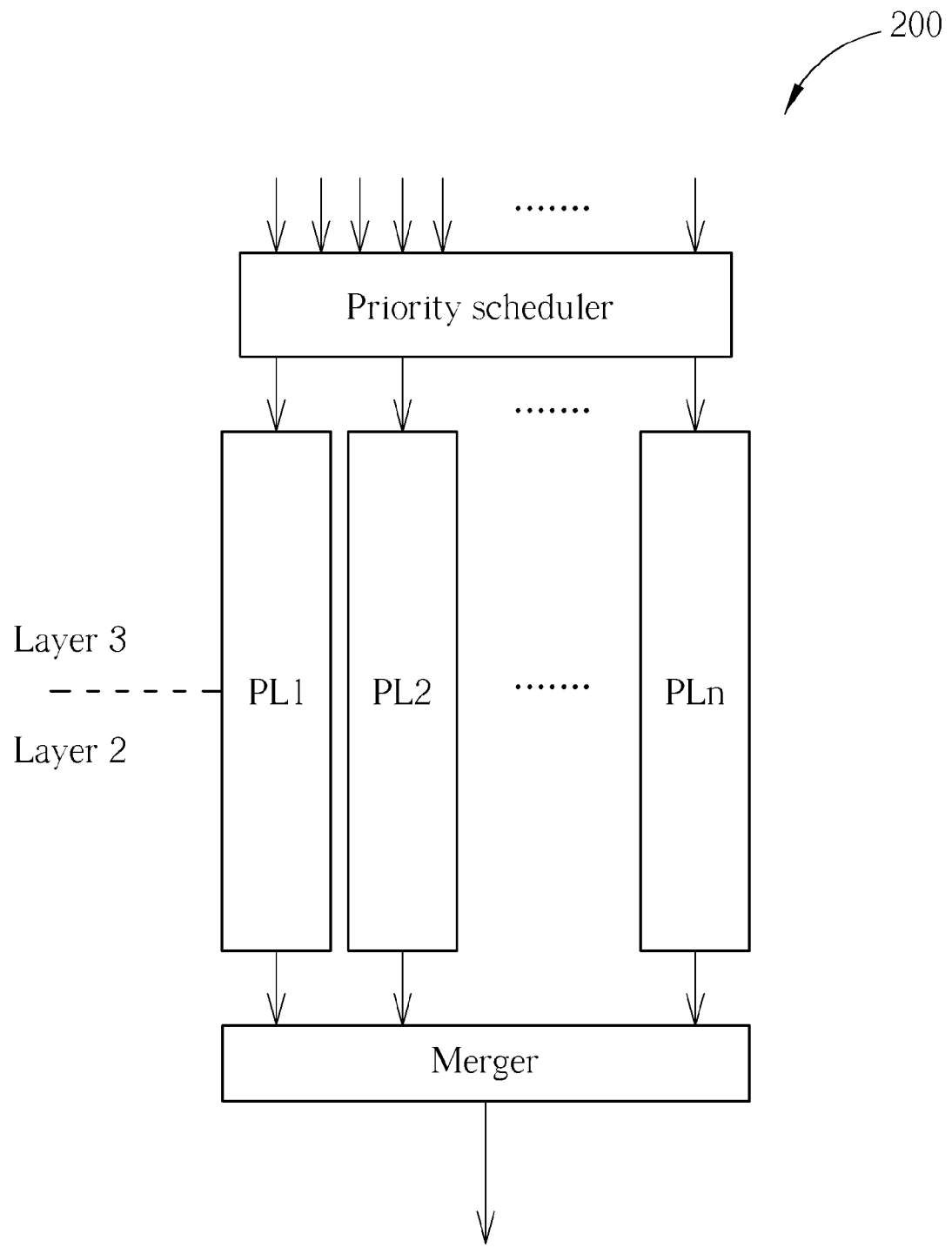

FIG. 2 is a diagram illustrating a network device 200 according to a second embodiment of the present invention. The network device 200 may be a receiving device or a transmitting device in a network environment based on OSI model. The intercommunication between layer 2 and layer 3 is also used for illustrating the second embodiment of the present invention. Meanwhile, a pipeline structure having pipelines PL1-PLn are used for parallel data transmission between layer 2 and layer 3 in the network device 200. Under normal circumstance, the speed relationship of the pipelines is as follows PL1>PL2> . . . >PLn. A priority scheduler is used in the network device 200 so that the data may be distributed via respective pipelines PL1-PLn according to data priority. In the network device 200 according to the second embodiment of the present invention, layer 2 only supports single rate AS protocol. Therefore, a merger is required for combining each piece of data transmitted via the pipelines PL1-PLn.

Figure 3:
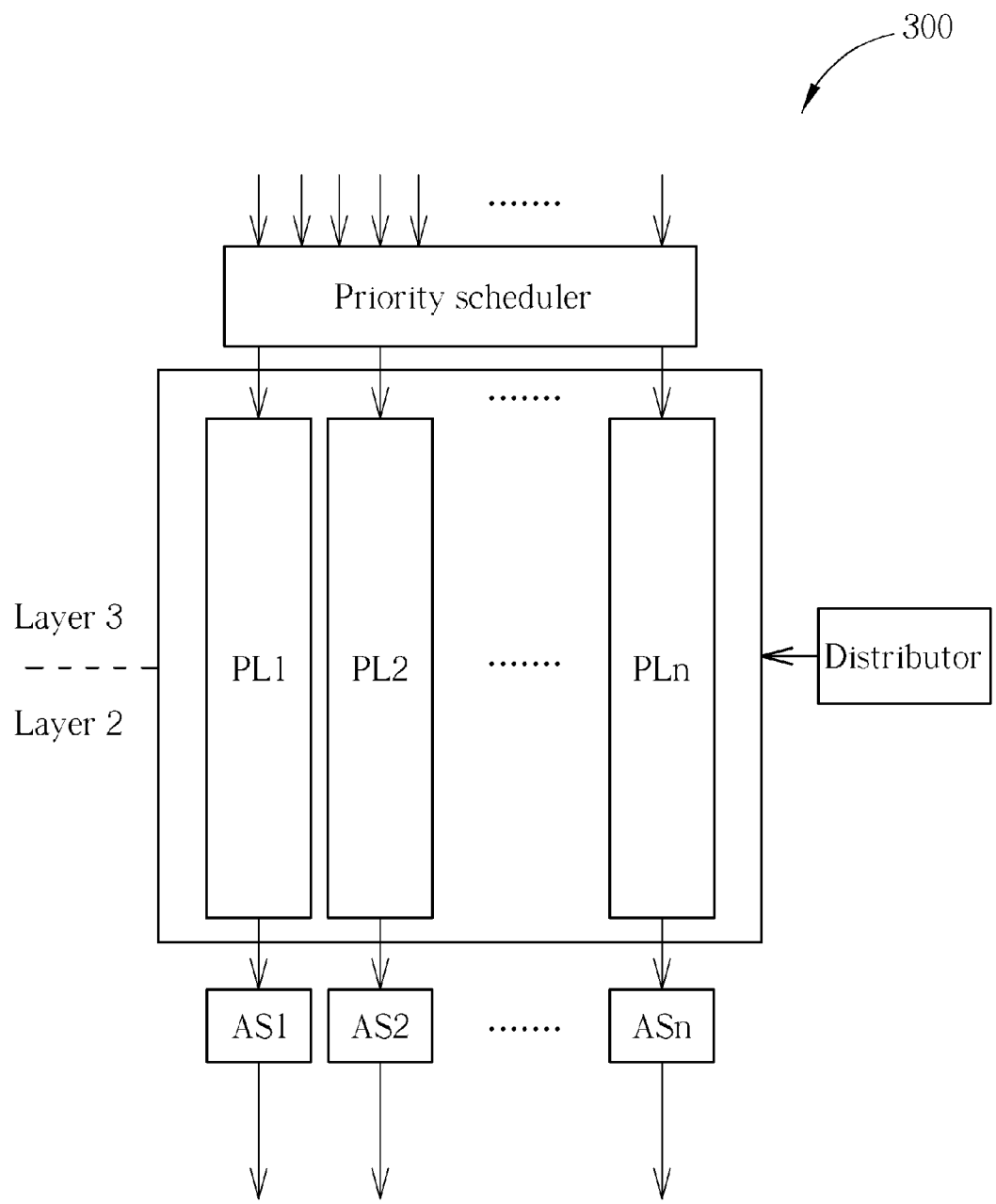
Figure 4:
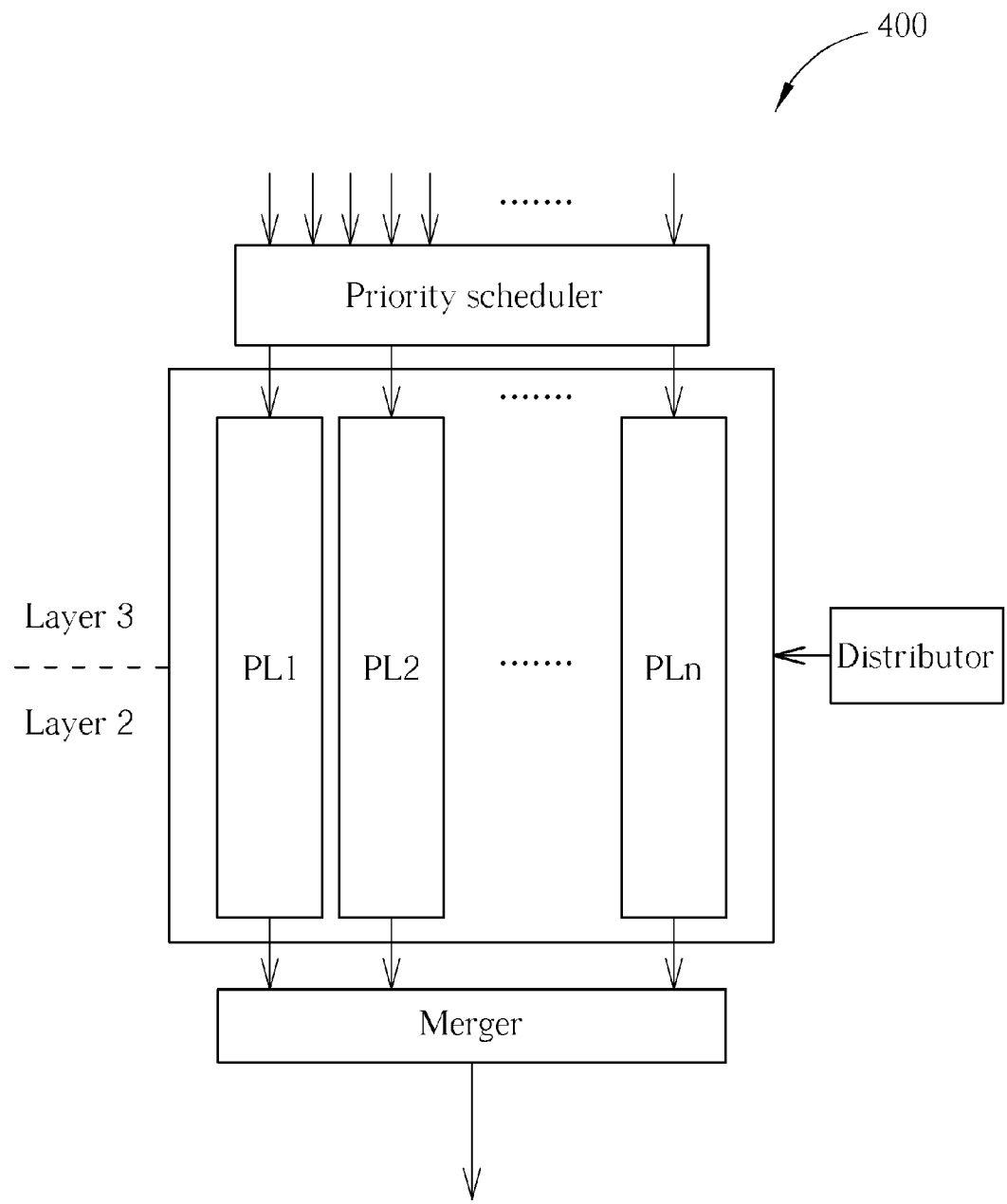

FIG. 3 is a diagram illustrating a network device 300 according to a third embodiment of the present invention, and FIG. 4 is a diagram illustrating a network device 400 according to a fourth embodiment of the present invention. The network device 300, having similar structure as the network device 100, further includes a distributor. The network device 400, having similar structure as the network device 200, further includes a distributor. The distributor is configured to dynamically adjust the size of each pipeline according to the transmission status of the pipelines PL1-PLn. For example, the distributor may be configured to detect pipeline parameters, such as network quality (QoS), channel quality indicator (CQI), data stall or data transfer reliability of each pipeline.

Figure 5A:
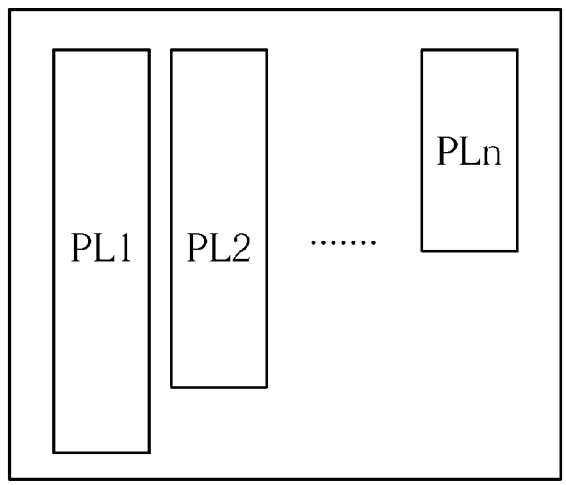
FIGS. 5A-5C are diagrams illustrating the operation of a distributor according to the present invention.
Figure 5B:
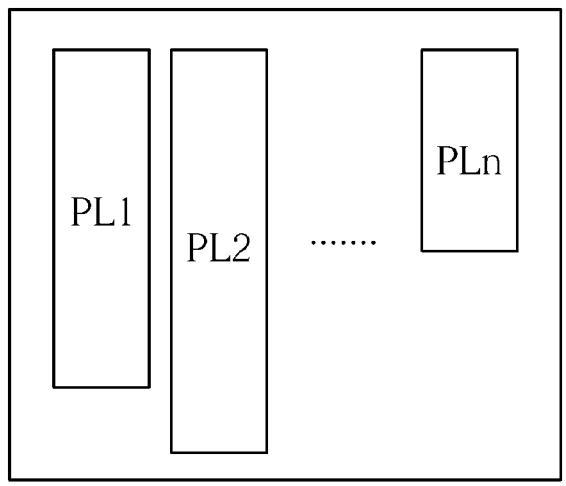
Figure 5C:
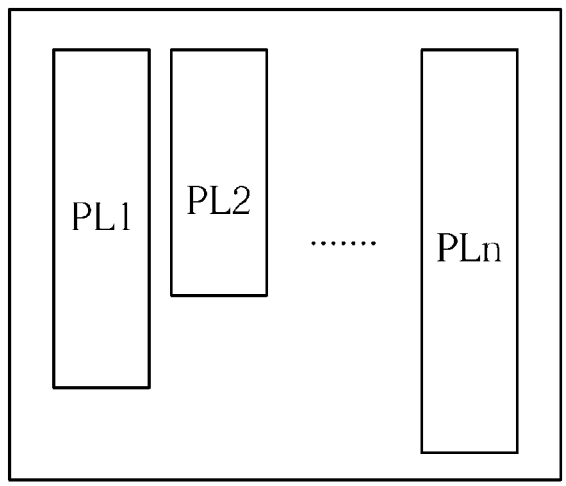

FIGS. 5A-5C are diagrams illustrating the operation of the distributor according to the present invention. Under the circumstance when all pipelines provide normal transmission, the distributor is configured to relocate resources according to the transmission rate of the pipelines PL1-PLn so that a faster pipeline may have a larger bandwidth, as depicted in FIG. 5A. If the transmission of the fastest pipeline PL1 is downgraded due to interference, the distributor is configured to relocate more resources to the pipeline PL2 which is the fastest pipeline still able to provide normal transmission, as depicted in FIG. 5B. If the slowest pipeline PLn is the only one able to provide normal transmission, the distributor is configured to relocate more resources to the pipeline PLn, as depicted in FIG. 5C. In other words, the third and fourth embodiments of the present invention may improve data throughput when facing poor pipeline transmission, thereby enhancing the overall system efficiency.

Although the intercommunication between layer 2 and layer 3 is used for illustrating the embodiments of the present invention, the present invention may also be used for intercommunication between other OSI layers, or be applied to other network structures.

For data transmission between different layers in a network device, data type is first determined in the present invention so as to handle high priority data using faster pipelines and handling low priority data using slower pipelines. Meanwhile, the size of each pipeline may be dynamically adjusted according to the quality of pipeline transmission, thereby enhancing the overall system efficiency.

Those skilled in the art will readily observe that numerous modifications and alterations of the device and method may be made while retaining the teachings of the invention.

What is claimed is:

1. A method for data transmission in a network device having a multi-layer structure, comprising:
   providing a plurality of pipelines, each pipeline having a specific assigned transmission rate;
   the plurality of pipelines transmitting a plurality of data in parallel between at least a first layer and a second layer of the multi-layer structure according to a data type of each data;
   processing the plurality of data respectively transmitted via the plurality of pipelines according to a plurality of AS (access stratum) protocols having varying transmission rates;
   determining a priority of each data according to the data type of each data; and
   processing a first data among the plurality of data according to a first AS protocol among the plurality of AS protocols and processing a second data among the plurality of data according to a second AS protocol among the plurality of AS protocols, wherein the first AS protocol is faster than the second AS protocol when it is determined that a priority of the first data is higher than a priority of the second data.

2. The method of claim 1, further comprising:
   determining a priority of each data according to the data type of each data; and
   transmitting a first data among the plurality of data using a first pipeline among the plurality of pipelines and transmitting a second data among the plurality of data using a second pipeline among the plurality of pipelines, wherein the first pipeline is faster than the second pipeline when it is determined that a priority of the first data is higher than a priority of the second data.

3. The method of claim 1, further comprising:
   merging the plurality of data respectively transmitted via the plurality of pipelines into a single piece of data.

4. The method of claim 1, further comprising:
   dynamically adjusting a size of each pipeline according to transmission statuses of the plurality of pipelines.

5. The method of claim 4, further comprising:
   detecting a network quality (QoS), a channel quality indicator (CQI), a data stall or a data transfer reliability of each pipeline for dynamically adjusting the size of each pipeline among the plurality of pipelines.

6. A pipeline network device, comprising:
   a first layer circuit;
   a second layer circuit;
   a plurality of pipelines, each pipeline having a specific assigned transmission rate, for transmitting a plurality of data in parallel between at least the first layer circuit and the second layer circuit of the multi-layer structure, wherein the plurality of data respectively transmitted via the plurality of pipelines is processed according to a plurality of AS (access stratum) protocols having varying transmission rates, wherein a first data among the plurality of data is processed according to a first AS protocol among the plurality of AS protocols and a second data among the plurality of data is processed according to a second AS protocol among the plurality of AS protocols; and
   a priority scheduler for distributing each data to a corresponding pipeline among the plurality of pipelines according to a data type of each data, wherein a priority of each data is determined according to the data type of each data, and the first AS protocol is faster than the second AS protocol when it is determined that a priority of the first data is higher than a priority of the second data.

7. The device of claim 6, further comprising:
   a merger for merging the plurality of data respectively transmitted via the plurality of pipelines into a single piece of data.

8. The device of claim 6, further comprising:
   a distributor for dynamically adjusting a size of each pipeline according to transmission statuses of the plurality of pipelines.

9. The device of claim 8, wherein the distributor is configured to dynamically adjust the size of each pipeline according to a network quality, a channel quality indicator, a data stall or a data transfer reliability of each pipeline.

10. A method for data transmission in a network device having a multi-layer structure, comprising:
    providing a plurality of pipelines, each pipeline having a specific assigned transmission rate;
    the plurality of pipelines transmitting a plurality of data in parallel between at least a first layer and a second layer of the multi-layer structure according to a data type of each data;

processing the plurality of data respectively transmitted via the plurality of pipelines according to a plurality of AS (access stratum) protocols having varying transmission rates;

determining a priority of each data according to the data type of each data;

transmitting a first data among the plurality of data using a first pipeline among the plurality of pipelines and transmitting a second data among the plurality of data using a second pipeline among the plurality of pipelines; and processing a first data among the plurality of data according to a first AS protocol among the plurality of AS protocols and processing a second data among the plurality of data according to a second AS protocol among the plurality of AS protocols, wherein the first pipeline is faster than the second pipeline and the first AS protocol is faster than the second AS protocol when it is determined that a priority of the first data is higher than a priority of the second data.

11. A pipeline network device, comprising:

a first layer circuit;

a second layer circuit;

a plurality of pipelines, each pipeline having a specific assigned transmission rate, for transmitting a plurality of data in parallel between at least the first layer circuit and the second layer circuit of the multi-layer structure, wherein the plurality of data respectively transmitted via the plurality of pipelines is processed according to a plurality of AS (access stratum) protocols having varying transmission rates, wherein a first data among the plurality of data is transmitted using a first pipeline among the plurality of pipelines and a second data among the plurality of data is transmitted using a second pipeline among the plurality of pipelines, wherein a first data among the plurality of data is processed according to a first AS protocol among the plurality of AS protocols and a second data among the plurality of data is processed according to a second AS protocol among the plurality of AS protocols; and a priority scheduler for distributing each data to a corresponding pipeline among the plurality of pipelines according to a data type of each data, wherein a priority of each data is determined according to the data type of each data, and the first pipeline is faster than the second pipeline and the first AS protocol is faster than the second AS protocol when it is determined that a priority of the first data is higher than a priority of the second data.

* * * * *